(12) United States Patent
Zai et al.

(10) Patent No.: US 11,098,250 B2
(45) Date of Patent: Aug. 24, 2021

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., Ltd., Shijiazhuang (CN)

(72) Inventors: Yameng Zai, Shijiazhuang (CN); Kai Xu, Shijiazhuang (CN); Guanchao Zhang, Shijiazhuang (CN); Ke-Lun Shu, Shijiazhuang (CN); Guoliang Yun, Shijiazhuang (CN); Gang Wen, Shijiazhuang (CN); Xiaoming Xiong, Shijiazhuang (CN); Wei Wang, Shijiazhuang (CN)

(73) Assignee: SHIJIAZHUANG CHENGZHI YONGHUA DISPLAY MATERIAL CO., LTD., Shijiazhuang (CN)

( * ) Notice: Subject to any disclaimer, the term of this patent is extended or adjusted under 35 U.S.C. 154(b) by 111 days.

(21) Appl. No.: 16/239,300

(22) Filed: Jan. 3, 2019

(65) Prior Publication Data

US 2019/0345390 A1    Nov. 14, 2019

(30) Foreign Application Priority Data

May 14, 2018 (CN) .......................... 201810457277.5

(51) Int. Cl.
| | |
|---|---|
| *G02F 1/1333* | (2006.01) |
| *C09K 19/34* | (2006.01) |
| *C09K 19/30* | (2006.01) |
| *G02F 1/137* | (2006.01) |
| *C09K 19/04* | (2006.01) |

(52) U.S. Cl.
CPC ...... *C09K 19/3491* (2013.01); *C09K 19/3003* (2013.01); *C09K 19/3066* (2013.01); *C09K 19/3402* (2013.01); *C09K 19/3405* (2013.01); *G02F 1/137* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2019/3408* (2013.01); *C09K 2019/3422* (2013.01); *G02F 1/13706* (2021.01)

(58) Field of Classification Search
CPC ............ C09K 19/3491; C09K 19/3003; C09K 19/3066; C09K 19/3402; C09K 19/3405; C09K 2019/0466; C09K 2019/3004; C09K 2019/3009; C09K 2019/301; C09K 2019/3016; C09K 2019/3408; C09K 2019/3422; G02F 1/1333; G02F 1/137; G02F 2001/13706

USPC ..................................................... 252/299.61
See application file for complete search history.

(56) References Cited

U.S. PATENT DOCUMENTS 10,655,062 B2 * 5/2020 Shu .................... C09K 19/14
2019/0353962 A1 * 11/2019 Li ..................... C09K 19/3066

* cited by examiner

*Primary Examiner* — Geraldina Visconti
(74) *Attorney, Agent, or Firm* — Muncy, Geissler, Olds & Lowe, P.C.

(57) ABSTRACT

Disclosed are a liquid crystal composition, a liquid crystal display element, and a liquid crystal display, said liquid crystal composition comprising one or more compounds represented by formula I, one or more compounds represented by formula II, one or more compounds represented by formula III and one or more compounds represented by formula IV,

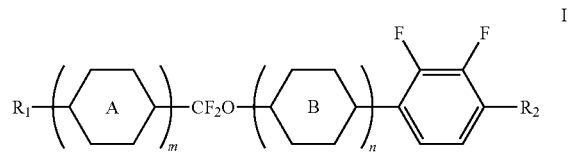

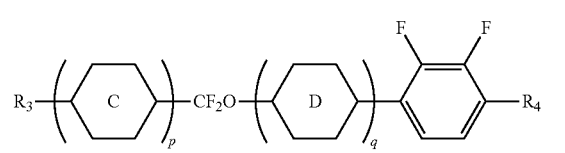

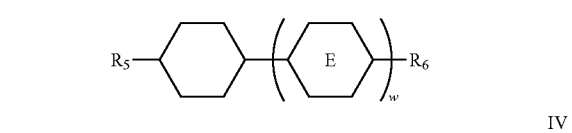

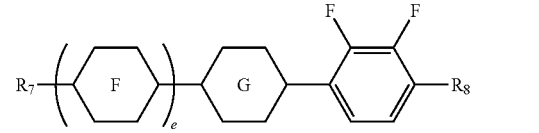

The liquid crystal composition of the present invention has a good stability to light and heat and a lower viscosity, and can attain a wider refractive index and a high clearing point (a wide service temperature range), and in particular, the liquid crystal composition has a high light transmittance, thus allowing a display device to have a high brightness or an energy saving effect.

10 Claims, No Drawings

LIQUID CRYSTAL COMPOSITION, LIQUID CRYSTAL DISPLAY ELEMENT AND LIQUID CRYSTAL DISPLAY

TECHNICAL FIELD

The present invention belongs to the technical field of liquid crystal materials, and particularly relates to a liquid crystal composition and a liquid crystal display element or liquid crystal display comprising the liquid crystal composition.

BACKGROUND ART

At present, liquid crystal display technologies have been maturely used in various display devices, have become a mainstream for products in the information display field, and have been widely used in various displays such as instruments and apparatuses, computers, televisions and mobile phones. According to the difference in the liquid crystal display mode, liquid crystal display devices can be classified into a plurality of modes, such as a twisted nematic phase (TN) mode, a super twisted nematic phase (STN) mode, a coplanar (IPS) mode, and a vertical alignment (VA) mode.

Thin film transistor displays (TFT-LCDs) have also rapidly grown into mainstream displays, which is inseparable from the advantages that they have.

The advantages thereof include:

1) a low viscosity, to meet fast response requirements;
2) a high voltage holding rate (VHR), which requires a high resistivity of a liquid crystal material, generally reaching $10^{13}$ Ω·cm;
3) a lower threshold voltage, which can meet a low voltage drive and achieve an environmentally friendly property of low power consumption; and
4) an optical anisotropy (Δn) matching with TFT-LCD, which eliminates a rainbow effect and gives better contrast and viewing angle properties.

As for dynamic picture display applications and the elimination of ghosting and trailing of display pictures, the liquid crystal is required to have a very fast response speed, and therefore the liquid crystal is required to have a lower rotary viscosity $\gamma_1$; in addition, for portable devices, the liquid crystal drive voltage is desired to be as low as possible, in order to reduce the energy consumption of the devices, and for displays for use in televisions, the requirement for a liquid crystal drive voltage is milder.

The viscosity, in particular rotary viscosity $\gamma_1$, of a liquid crystal compound directly affects the response time after the liquid crystal is energized, and both the rise time ($t_{on}$) and fall time ($t_{off}$) are proportional to the rotary viscosity $\gamma_1$ of the liquid crystal; moreover, since the rise time ($t_{on}$) is further related to a liquid crystal cell and the drive voltage, it can be adjusted by means of increasing the drive voltage and reducing the thickness of the liquid crystal cell; while the fall time ($t_{off}$) is irrelevant to the drive voltage, but is mainly related to the elastic constant of the liquid crystal and the thickness of the liquid crystal cell, and thinning of cell thickness can result in a decrease in fall time ($t_{off}$); moreover, in different display modes, the movement manners of liquid crystal molecules are different, and the three modes TN, IPS and VA are inversely proportional to the mean elastic constant K, twist elastic constant and bend elastic constant, respectively.

The transmittance of a TFT-LCD panel refers to the ratio of the light intensity of a backlight before and after passing through the TFT-LCD panel. TFT-LCD is an inefficient device with a transmittance of only 3-10%; where the brightness of the backlight is 100, most of the light that is incident from the backlight and passes through various layers of the panel is absorbed, and the brightness of the light that has finally passed through the panel is only 5, that is to say, the transmittance is only 5%, so only a small part of the light can be effectively utilized and captured by human eyes.

If the transmittance of the liquid crystal can be improved, the transmittance of the TFT-LCD panel can be effectively increased, so more light can be effectively utilized; and in another aspect, the intensity of the backlight can be reduced, thereby achieving the purpose of saving energy consumption and extending the service time of a device.

SUMMARY OF THE INVENTION

The technical problem to be solved by the present invention is to provide a liquid crystal composition that has a good stability to light and heat, a lower viscosity and a faster response speed, and can attain a wider refractive index and a higher clearing point (a very wide service temperature range), in particular, a liquid crystal composition that has a higher light transmittance, and a liquid crystal display element or display device that has a higher brightness or an energy saving effect.

In order to solve the above technical problems, the present invention provides a liquid crystal composition comprising one or more compounds represented by formula I, one or more compounds represented by formula II, one or more compounds represented by formula III and one or more compounds represented by formula IV,

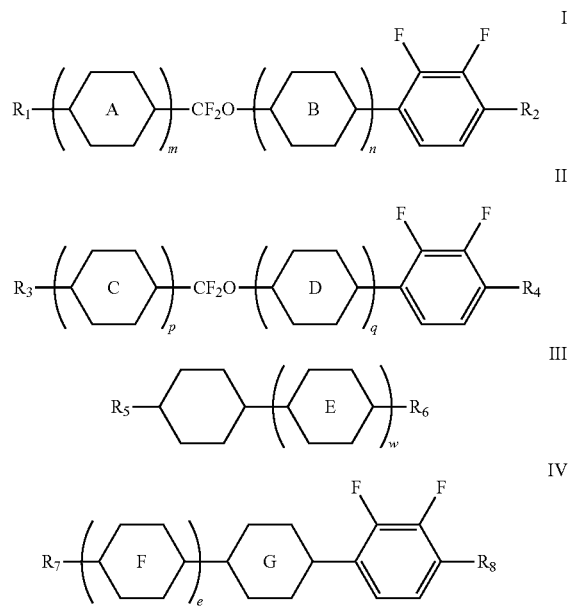

wherein $R_1$, $R_2$, $R_3$, $R_5$, $R_6$ and $R_7$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8, and any one or more non-connected $CH_2$ in the groups represented by $R_1$ and $R_3$ are substituted with cyclopentyl, cyclobutyl, cyclopropyl or —O—;

$R_8$ represents F, $CF_3$, $OCF_3$, $OCHF_2$ or $OCH_2F$;

$R_4$ represents F, $CF_3$, $OCF_3$, $OCHF_2$ or $OCH_2F$;

each independently represent one or more of

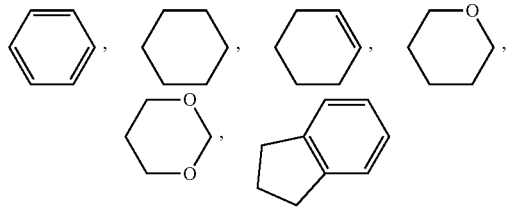

or any fluorobenzene;

each independently represent one or more of benzene or any fluorobenzene;

represents one or more of

or any fluorobenzene;

m, p and w each independently represent 1, 2 or 3;
n and q each independently represent 0 or 1; and
e represents 0, 1, 2 or 3.

In the liquid crystal composition of the present invention, preferably, said one or more compounds represented by formula I are one or more of compounds represented by formulas I1 to I14; said one or more compounds represented by formula II are one or more of compounds represented by formulas II1 to II14; said one or more compounds represented by formula III are one or more of compounds represented by formulas III111 to III5; said one or more compounds represented by formula IV are one or more of compounds represented by formulas IV1 to IV24,

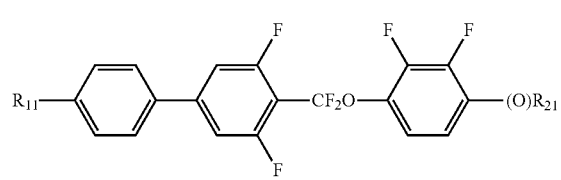

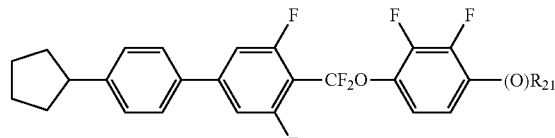

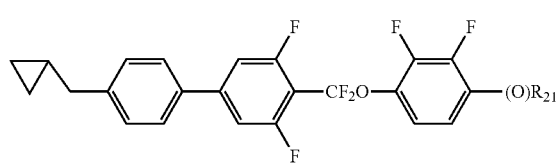

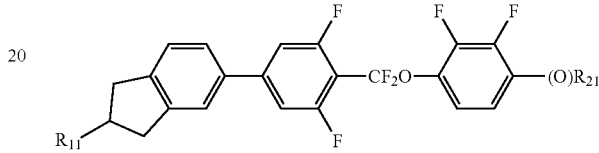

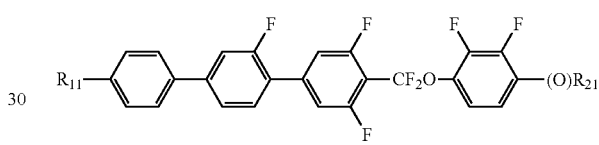

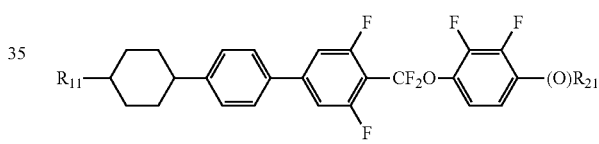

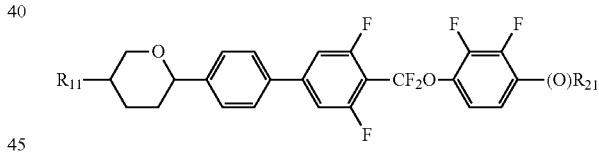

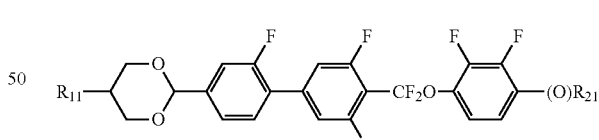

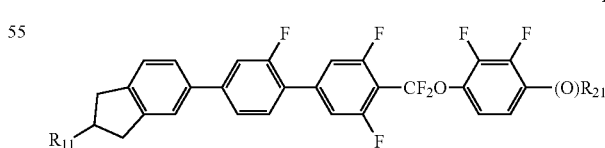

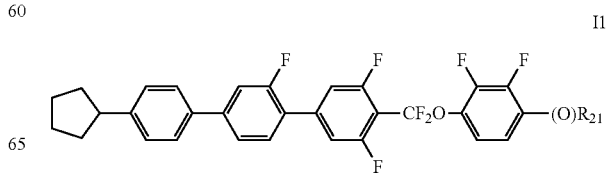

I11
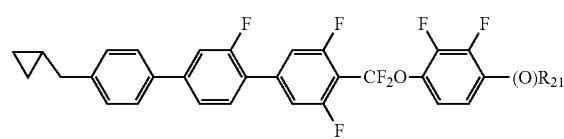
I12
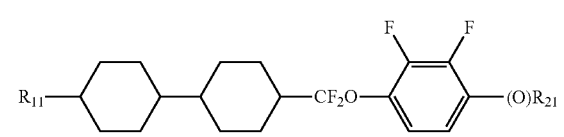
I13
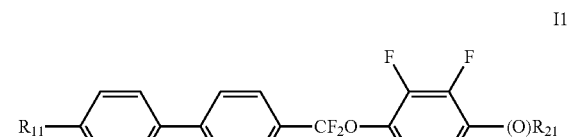
I14
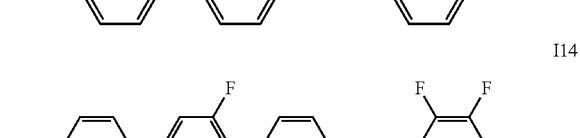
II1
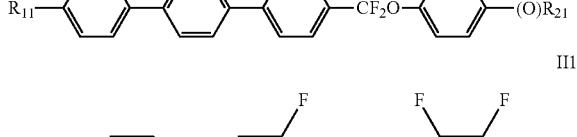
II2
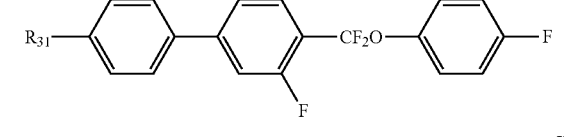
II3
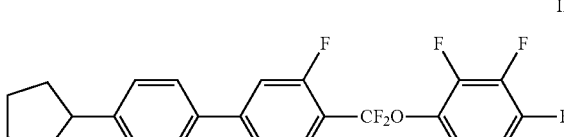
II4
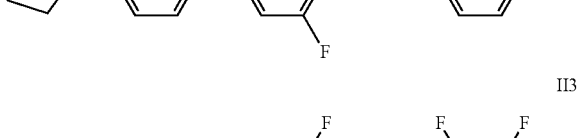
II5
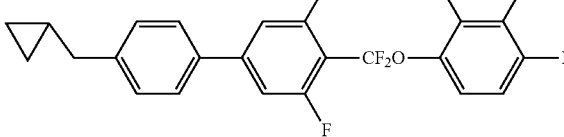
II6
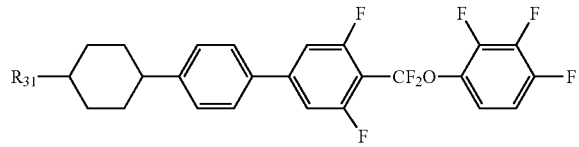
II7
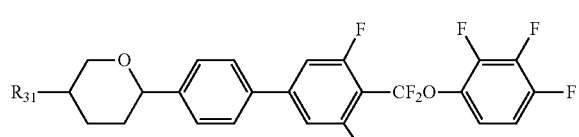
II8
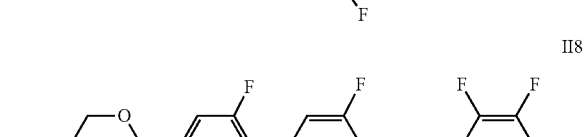
II9
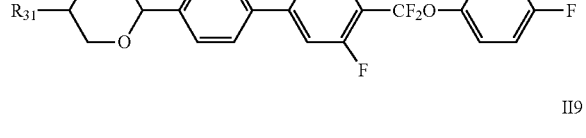
II10
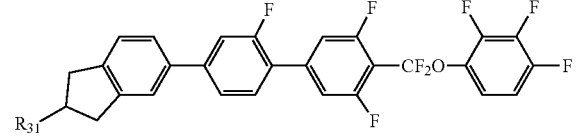
II11
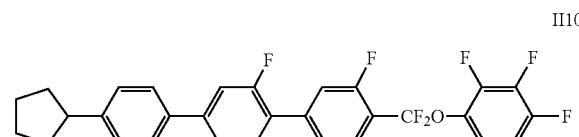
II12
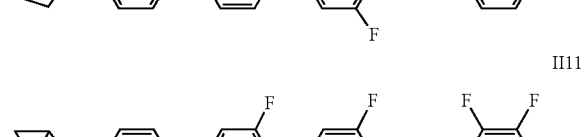
II13
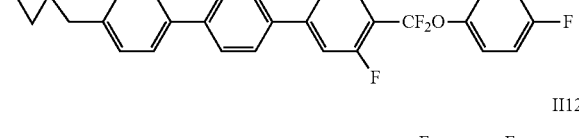
II14
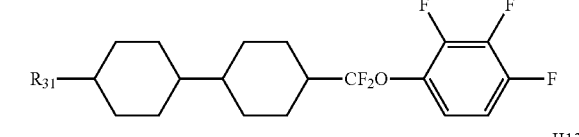
III1
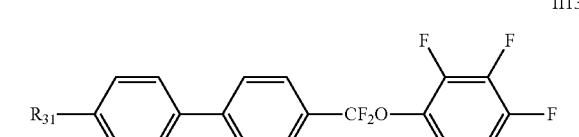

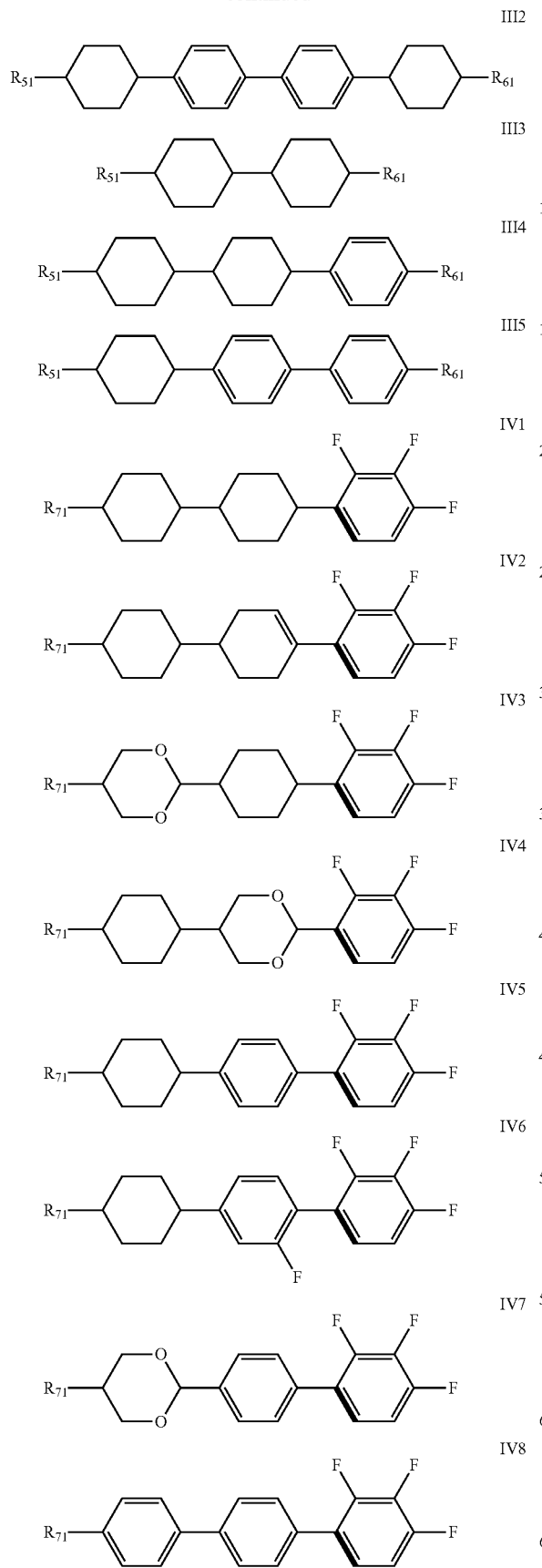
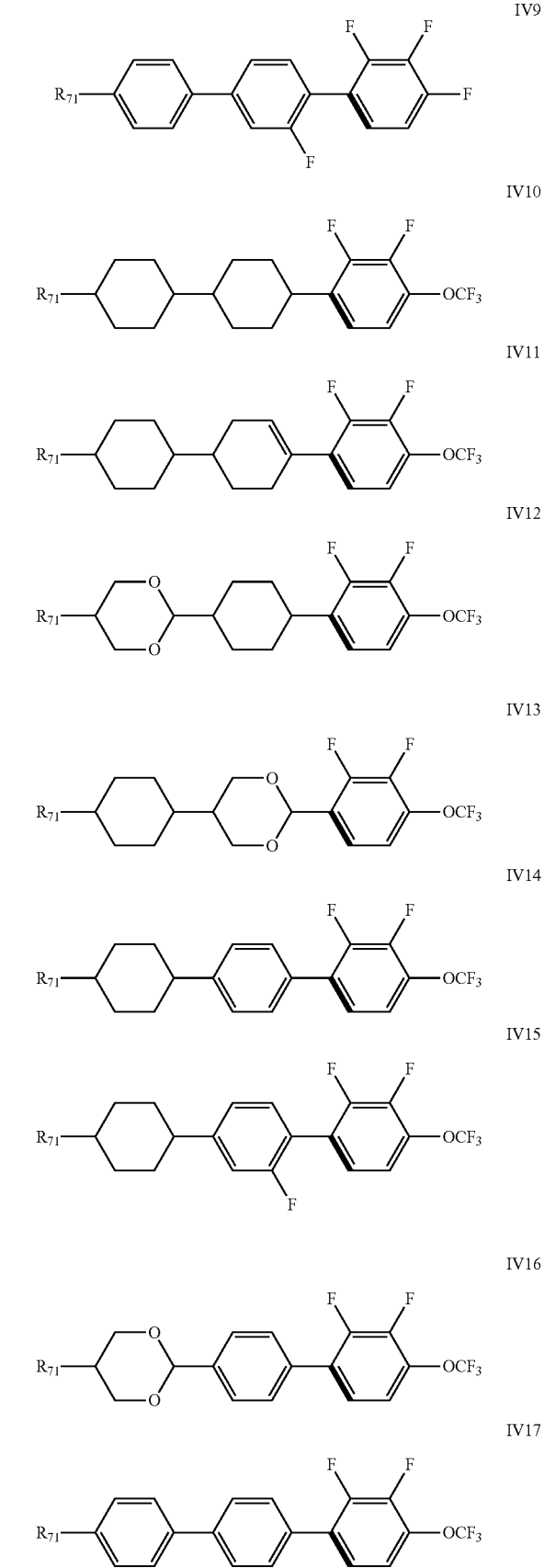

-continued

IV18
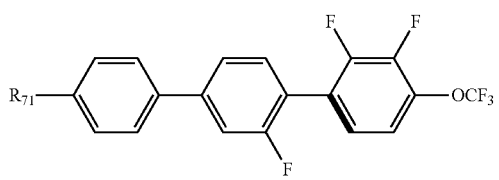

IV19
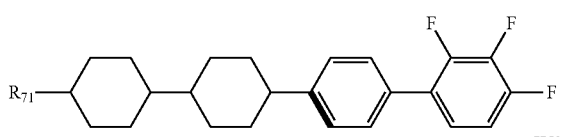

IV20
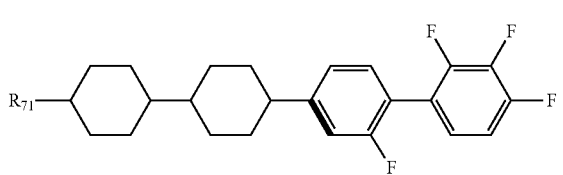

IV21
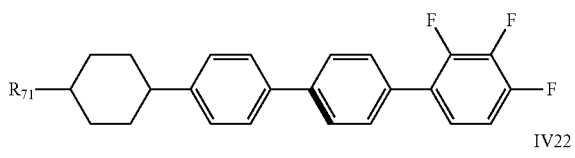

IV22
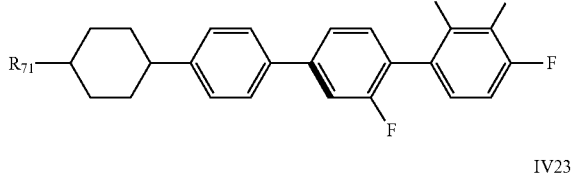

IV23

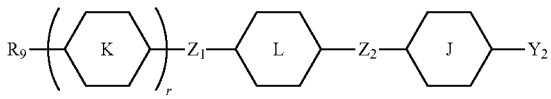

IV24 wherein $R_{11}$ and $R_{31}$ each independently represent an alkyl group having a carbon atom number of 1-6;

$R_{21}$ represents an alkyl having a carbon atom number of 1-5;

$R_{51}$ and $R_{61}$ each independently represent an alkyl group having a carbon atom number of 1-6, an alkoxy group having a carbon atom number of 1-6, an alkenyl group having a carbon atom number of 2-6 or an alkenyloxy group having a carbon atom number of 3-6;

and $R_{71}$ represents an alkyl group having a carbon atom number of 1-6 or an alkenyl group having a carbon atom number of 2-6.

The compound represented by formula I has both larger dielectric constants in the parallel direction and vertical direction to the long-axis of the liquid crystal molecule and smaller dielectric anisotropies (Δε) in the parallel direction and vertical direction to the long-axis. The compound represented by formula II has both larger dielectric anisotropies in the parallel direction and vertical direction to the long-axis of the liquid crystal molecule and larger dielectric anisotropies (Δε) in the long-axis parallel direction and vertical direction. The liquid crystal compound represented by formula IV has larger dielectric constants in the parallel direction and vertical direction to the long-axis of the molecule and also larger dielectric anisotropies (Δε) in the parallel direction and vertical direction to the long-axis. The combination of the compounds of formulas I, II and IV can significantly increase the dielectric constant in the vertical direction of the mixed composition without reducing the Δε of the liquid crystal composition, so that the transmittance of the liquid crystal composition can be greatly improved. The compound represented by formula III has a low rotary viscosity and also a higher clearing point (Cp); in addition, when the compound is used in combination with compounds represented by formulas I, II and V, the liquid crystal composition has a very low the rotary viscosity and a fast response speed.

In the liquid crystal composition of the present invention, preferably, the total content in mass percentage of said one or more compounds represented by formula I is 1-40%, the total content in mass percentage of said one or more compounds represented by formula II is 1-40%, the total content in mass percentage of said one or more compounds represented by formula III is 1-80%, and the total content in mass percentage of said one or more compounds represented by formula IV is 0.5-30%.

The liquid crystal composition of the present invention may preferably further comprise one or more compounds represented by formula V,

V

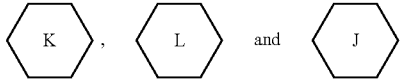

wherein $R_9$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or an fluoro-substituted alkenoxy group having a carbon atom number of 3-8, and any one or more $CH_2$ in the group represented by $R_9$ are optionally substituted with cyclopentyl, cyclobutyl or cyclopropyl;

K, L and J each independently represent one or more of

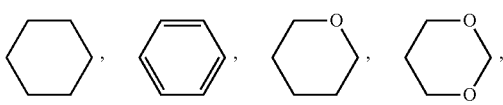

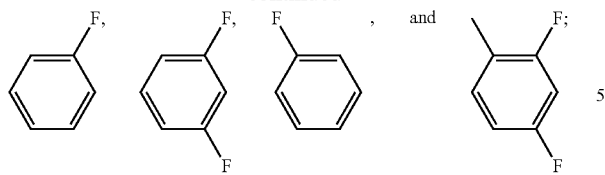

r represents 0, 1, 2 or 3;

$Z_1$ and $Z_2$ each independently represent a single bond, —$CF_2O$—, —$CH_2CH_2$— or —$CH_2O$—;

and $Y_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

The compound represented by formula V has a larger dielectric anisotropy (Δε), and the addition of the compound of formula V to the liquid crystal composition of the present invention is advantageous for improving the dielectric anisotropy (Δε) of the liquid crystal composition and reduce the drive voltage of the liquid crystal. The liquid crystal composition to which the compound represented by formula V has been added may be suitable for use in positive TN, IPS and FFS modes, or may also be suitable for PSA-positive TN, IPS and FFS modes.

In the liquid crystal composition of the present invention, where a compound represented by formula V is added, it is preferable that the total addition amount of the compound represented by formula V is in the range of 5-40%. In the liquid crystal composition of the present invention, where one or more compounds represented by formula V as mentioned previously are comprised, said one or more compounds represented by formula V are selected from the groups consisting of compounds represented by formulas V0 to V25,

V0

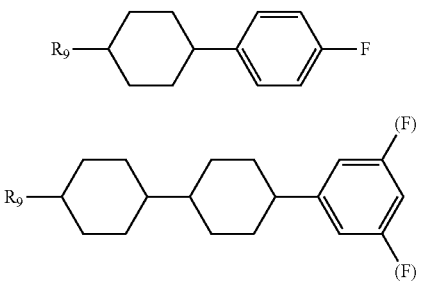

V1

V2

V3

V4

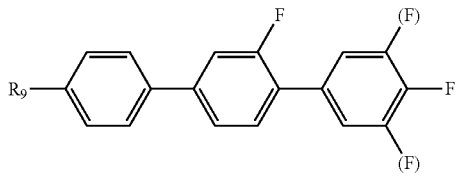

V5

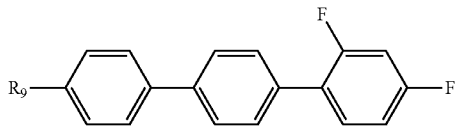

V6

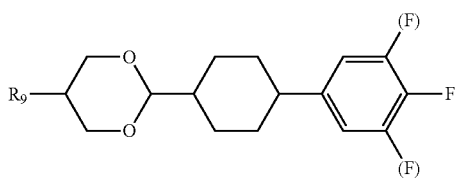

V7

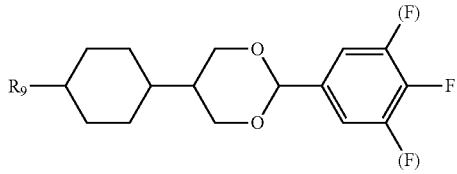

V8

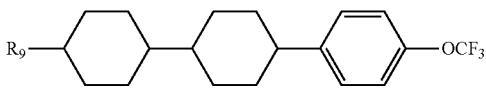

V9

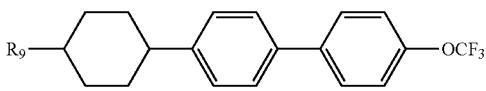

V10

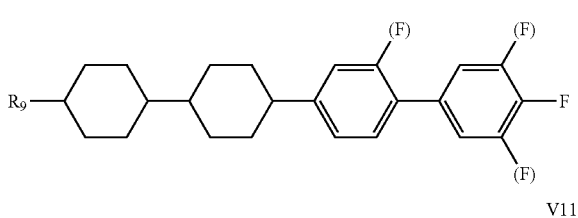

V11

V12

V13
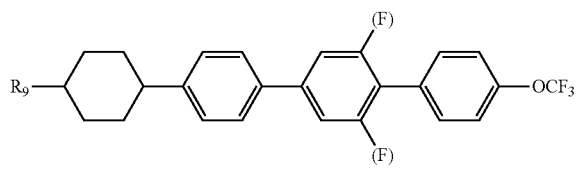

V14
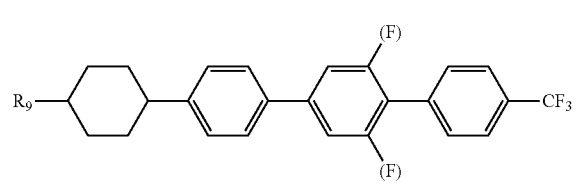

V15
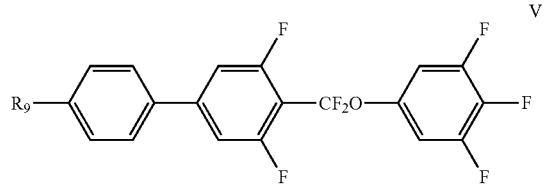

V16
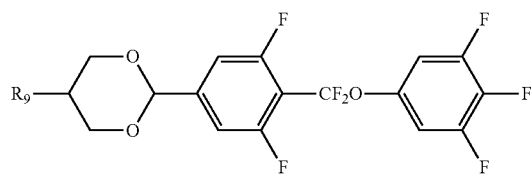

V17
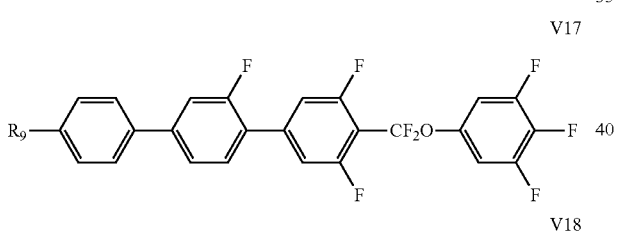

V18
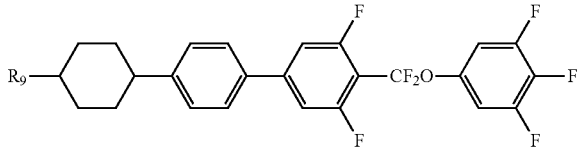

V19
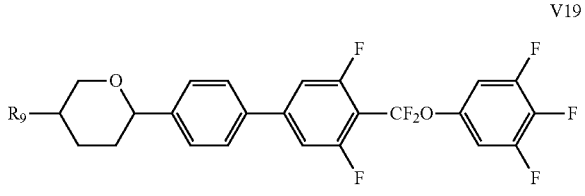

V20
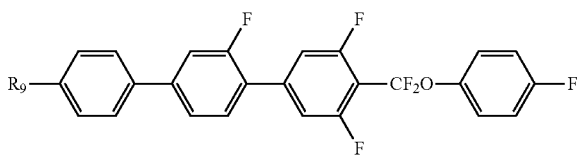

V21
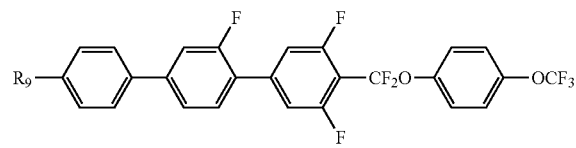

V22
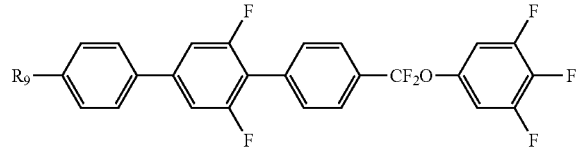

V23
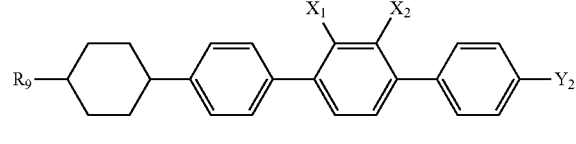

V24
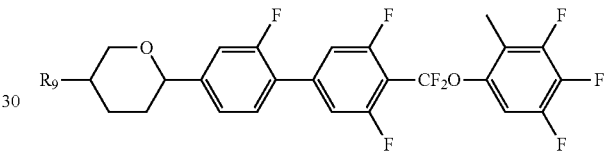

V25 wherein $R_9$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the group represented $R_9$ are substituted with cyclopentyl, cyclobutyl or cyclopropyl;

(F) represents H or F; and in formula V23, $X_1$ and $X_2$ each independently represent H or F, $Y_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5 or a fluoro-substituted alkenoxy group having a carbon atom number of 3-8.

The liquid crystal composition of the present invention may further comprise one or more compounds represented by formula VI,

VI

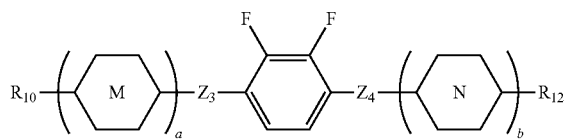

wherein $R_{10}$ and $R_{12}$ each independently represent an alkyl group having a carbon atom number of 1-10, fluoro, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_{10}$ and $R_{12}$ are optionally substituted with cyclopentyl, cyclobutyl or cyclopropyl;

$Z_3$ and $Z_4$ each independently represent a single bond, —$CH_2CH_2$— or —$CH_2O$—;

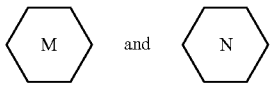

each independently represent

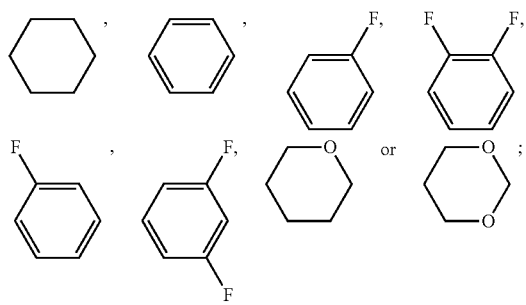

a represents 1, 2 or 3;
b represents 0 or 1.

In the liquid crystal composition of the present invention, where one or more compounds represented by formula VI are comprised, said one or more compounds represented by formula VI are preferably selected from compounds represented by formulas VI1 to VI12.

VI1

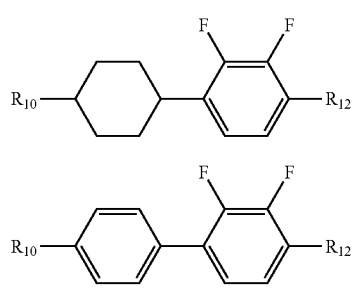

VI2

VI3

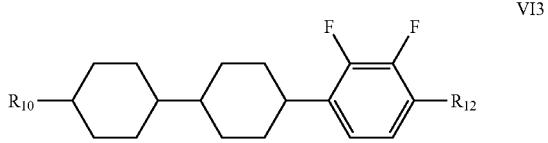

VI4

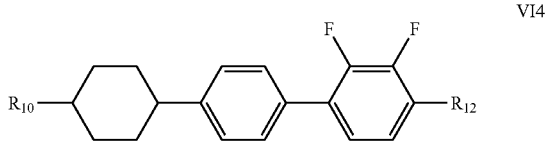

VI5

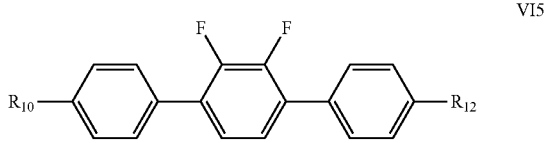

VI6

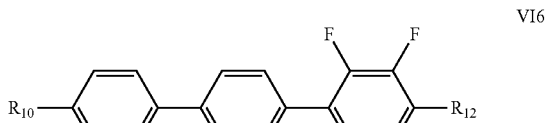

VI7

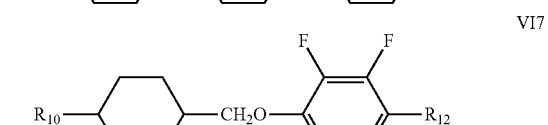

VI8

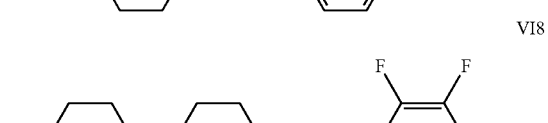

VI9

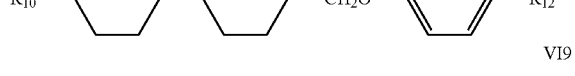

VI10

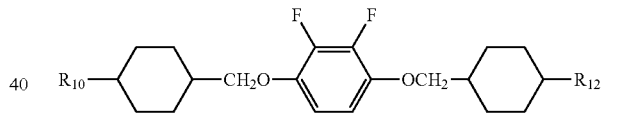

VI11

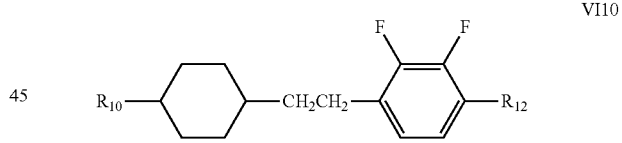

VI12

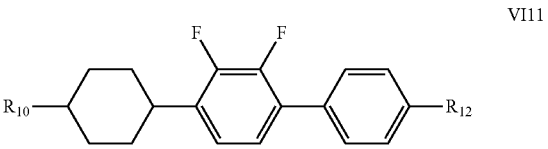

wherein $R_{10}$ and $R_{12}$ each independently represent an alkyl group having a carbon atom number of 1-10, fluoro, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_{10}$ and $R_{12}$ are optionally substituted with cyclopentyl, cyclobutyl or cyclopropyl.

In the liquid crystal composition of the present invention, the total addition amount of the compound represented by formula VI is preferably in the range of 0-60%, further preferably 5-30%.

The liquid crystal composition of the present invention may further comprise one or more compounds represented by formula VII.

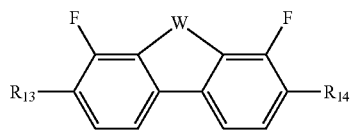

VII wherein $R_{13}$ and $R_{14}$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_{13}$ and $R_{14}$ are optionally substituted with cyclopentyl, cyclobutyl or cyclopropyl;

and W represents —O—, —S— or —$CH_2$O—.

The liquid crystal composition of the present invention may further comprise one or more compounds represented by formula VIII.

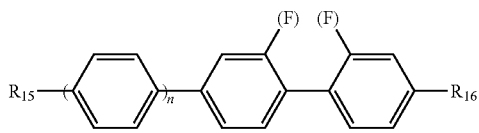

VIII wherein $R_{15}$ represents an alkyl group having a carbon atom number of 1-5 or an alkenyl group having a carbon atom number of 2-5;

$R_{16}$ represents an F atom, an alkyl group having a carbon atom number of 1-5, an alkoxy group having a carbon atom number of 1-5 or an alkenyl group having a carbon atom number of 2-5, and any one or more $CH_2$ in the groups represented by $R_{15}$ and $R_{16}$ are optionally substituted with cyclopentyl, cyclobutyl or cyclopropyl;

n represents 0 or 1; and (F) represents H or F.

The present invention further relates to a liquid crystal display element or liquid crystal display comprising the above-mentioned liquid crystal composition, and said liquid crystal display element or liquid crystal display is an active matrix display element or display or a passive matrix display element or display.

The display element or display may also be any one of TN, ECB, VA, IPS, FFS, PS-TN, PS-VA, PS-IPS, PS-FFS, PA-VA, PA-IPS, PA-FFS, PI-less VA, PI-less IPS and PI-less-FFS LCD modes, etc.

DETAILED DESCRIPTION OF EMBODIMENTS

The present invention is further described in conjunction with particular examples below, but the present invention is not limited to the following examples. Methods for the synthesis of compounds in liquid crystal compositions are all conventional methods, unless otherwise specified. Raw materials for the synthesis of the liquid crystal compositions are all commercially available, unless otherwise specified.

In the reaction process, the reaction progress is generally monitored by means of TLC, and treatments after the completion of the reaction are generally water washing, extraction, organic phase combination and drying, solvent evaporation under reduced pressure, as well as recrystallization and column chromatography; and a person skilled in the art would be able to implement the present invention according to the following description.

In the present specification, the percentages are mass percentages, the temperatures are in degree Celsius (° C.), and the specific meanings of other symbols and the test conditions are as follows:

Cp represents a clearing point (° C.) of the liquid crystal measured by a DSC quantitative method;

Δn represents an optical anisotropy, $n_o$ is the refractive index of an ordinary light, $n_e$ is the refractive index of an extraordinary light, the test conditions are 25±2° C., 589 nm and an Abbe refractometer is used for the test;

Δε represents a dielectric anisotropy, $\Delta\varepsilon=\varepsilon_{//}-\varepsilon_{\perp}$, wherein $\varepsilon_{//}$ is a dielectric constant parallel to a molecular axis, and $\varepsilon_{\perp}$ is a dielectric constant perpendicular to the molecular axis, the test conditions are 25±0.5° C., and a 20 micron parallel cell is used and an INSTEC: ALCT-IR1 is used for the test;

γ1 represents a rotary viscosity (mPa·s), the test conditions are 25±0.5° C., and a 20 micron parallel cell is used and an INSTEC: ALCT-IR1 is used for the test; and Tr (%) represents a transmittance, Tr (%)=100%*bright state (Vop) luminance/light source luminance, the test equipment is DMS501, and the test conditions are 25±0.5° C., the test cell is a 3.3 micron IPS test cell, both the electrode spacing and the electrode width both are 10 microns, and an included angle between the frictional direction and the electrode of 10°; since $\varepsilon_{\perp}$ and Tr have a positive correlation, when evaluating the transmittance, $\varepsilon_{\perp}$ can be used as an evaluation index for indication.

In the examples of the present invention application, liquid crystal monomer structures are represented by codes, wherein the code representation of ring structures, end groups and linking groups of the liquid crystals are shown in tables (I) and (II) below.

TABLE (I)

Corresponding code for ring structure

| Ring structure | Corresponding code |
|---|---|
|  | C |

TABLE (I)-continued

Corresponding code for ring structure

| Ring structure | Corresponding code |
|---|---|
| 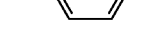 | P |
|  | G |
|  | U |
|  | GI |
|  | Y |
|  | A |
|  | D |
|  | L |
|  | BHHO-m-nFF |
|  | B |
|  | B(S) |

TABLE (II)

Corresponding code for end group and linking group

| End group and linking group | Corresponding code |
|---|---|
| $C_nH_{2n+1}$— | n- |
| $C_nH_{2n+1}O$— | nO- |
| —$OCF_3$ | OT |
| —$CF_3$ | -T |
| —$CF_2O$— | Q |
| —F | —F |
| —CN | —N |
| —$CH_2CH_2$— | E |
| —CH=CH— | V |
| —C≡C— | T |
| —COO— | Z |
| —CH=CH—$C_nH_{2n+1}$ | -Vn |
| 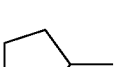 | C(5) |
|  | C(4) |
| 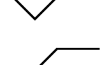 | C(3)1 |

EXAMPLES

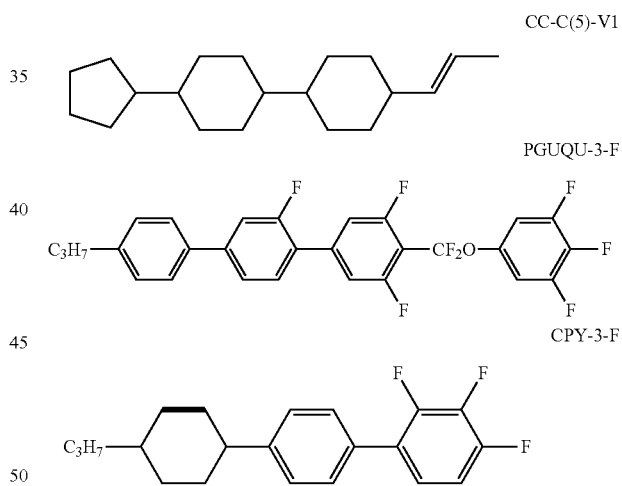

CC-C(5)-V1

PGUQU-3-F

CPY-3-F

Example 1

| Category | Liquid crystal monomer code | Content (%) |
|---|---|---|
| VI | CY-3-O2 | 2 |
| VI | CCY-3-O2 | 3 |
| VI | PY-5-O2 | 2 |
| VI | CPY-3-O2 | 3 |
| V | CCU-3-F | 5 |
| V | CGU-5-F | 3 |
| V | PGUQU-3-F | 2 |
| III | CC-3-V | 20 |
| II | PUQY-3-F | 10 |
| II | PUQY-5-F | 10 |

| Category | Liquid crystal monomer code | Content (%) |
|---|---|---|
| II | PGUQY-3-F | 10 |
| I | PUQY-3-O2 | 10 |
| I | PUQY-3-O4 | 10 |
| I | PGUQY-3-O2 | 10 |

Δε[1 KHz, 20° C.]: 4.7
$\varepsilon_\perp$: 6.3
Δn[589 nm, 20° C.]: 0.133
Cp: 105° C.
$\gamma_1$: 68 mPa · s.
Tr: 6.5%

Example 2

| Category | Liquid crystal monomer code | Content (%) |
|---|---|---|
| IV | CPY-3-F | 3 |
| IV | CCY-5-F | 5 |
| IV | CGY-3-F | 5 |
| IV | PPY-3-F | 2 |
| III | CC-3-V | 20 |
| III | CCP-3-O1 | 5 |
| III | CPP-1-5 | 5 |
| II | PUQY-3-F | 5 |
| II | PGUQY-5-F | 5 |
| II | PUQY-5-F | 5 |
| I | PUQY-C(3)1-O2 | 8 |
| I | PGUQY- C(3)1-O2 | 8 |
| I | PUQY-3-O2 | 8.5 |
| I | PGUQY-3-O2 | 8 |
| I | APUQY-3-O2 | 7.5 |

Δε[1 KHz, 20° C.]: 4.6
$\varepsilon_\perp$: 6.8
Δn[589 nm, 20° C.]: 0.101
Cp: 80° C.
$\gamma_1$: 99 mPa · s.
Tr: 7.3%

The liquid crystal compositions are poured into test cells for testing, resulting in: the transmittance of Example 1 being 6.5% and the transmittance of Example 2 being 7.3%, which is increased by 12% higher than that of Example 1.

Example 3

| Category | Liquid crystal monomer code | Content (%) |
|---|---|---|
| IV | CPY-5-F | 2 |
| IV | CDY-4-F | 1 |
| IV | CGY-5-OT | 2 |
| IV | CPY-2-OT | 2 |
| III | CC-3-V | 44 |
| III | CC-2-3 | 4 |
| III | CCP-3-1 | 4 |
| II | PUQY-3-F | 10 |
| II | PGUQY-5-F | 10 |
| II | PUQY-5-F | 10 |
| II | PGUQY-4-F | 10 |
| I | PGUQY-3-O2 | 1 |

Δε[1 KHz, 20° C.]: 2.4
$\varepsilon_\perp$: 4.9
Δn[589 nm, 20° C.]: 0.101
Cp: 77° C.
$\gamma_1$: 77 mPa · s.
Tr: 7.1%

Example 4

| Category | Liquid crystal monomer code | Content (%) |
|---|---|---|
| IV | CPY-C(5)-F | 6 |
| IV | CLY-4-F | 6 |
| IV | PGY-C(3)-OT | 6 |
| IV | CCPY-2-F | 6 |
| IV | CCGY-3-F | 6 |
| III | CC-3-V | 35 |
| III | CC-3-5 | 5 |
| III | CCP-V-OT | 8 |
| II | DGUQY-3-F | 1 |
| I | PUQY-3-02 | 6 |
| I | APUQY-3-02 | 5 |
| I | CPUQY-3-02 | 5 |
| I | PGUQY-3-02 | 5 |

Δε[1 KHz, 20° C.]: 2.5
$\varepsilon_\perp$: 4.8
Δn[589 nm, 20° C.]: 0.101
Cp: 82° C.
$\gamma_1$: 80 mPa · s.
Tr: 7.1%

Example 5

| Category | Liquid crystal monomer code | Content (%) |
|---|---|---|
| V | PUQU-3-F | 5 |
| IV | CPY-C(3)-F | 1 |
| III | CC-3-V | 50 |
| III | CCP-V-1 | 8 |
| III | CCP-V2-1 | 8 |
| III | CP-3-O2 | 3 |
| III | CCG-V-F | 7 |
| III | CGPC-3-3 | 4 |
| II | DGUQY-3-F | 3 |
| II | PGUQY-5-F | 2 |
| I | PUQY-3-O2 | 3 |
| I | PGUQY-3-O2 | 3 |
| I | PGUQY-C(3)1-O2 | 3 |

Δε[1 KHz, 20° C.]: 4.0
$\varepsilon_\perp$: 7.0
Δn[589 nm, 20° C.]: 0.105
Cp: 77° C.
$\gamma_1$: 60 mPa · s.
Tr: 7.4%

Example 6

| Category | Liquid crystal monomer code | Content (%) |
|---|---|---|
| V | CCU-3-F | 5 |
| V | CPU-3-F | 5 |
| V | CCP-3-OT | 5 |
| V | PGUQU-C(5)-F | 5 |
| IV | CPY-2-F | 3 |
| IV | CPPY-4-F | 3 |
| III | CC-3-V | 30 |
| III | CCP-3-V1 | 2 |
| III | CP-3-O2 | 3 |
| II | DGUQY-3-F | 9 |
| II | PGUQY-5-F | 9 |
| II | PUQY-3-F | 9 |
| II | CUQY-3-F | 5 |

-continued

| Category | Liquid crystal monomer code | Content (%) |
|---|---|---|
| I | PUQY-3-O2 | 3 |
| I | PUQY-5-O2 | 3 |

Δε[1 KHz, 20° C.]: 3.7
$\varepsilon_\perp$: 6.8
Δn[589 nm, 20° C.]: 0.107
Cp: 78° C.
$\gamma_1$: 77 mPa·s.
Tr: 7.0%

Example 7

| Category | Liquid crystal monomer code | Content (%) |
|---|---|---|
| V | CGU-5-F | 5 |
| V | APUQU-C(5)-F | 5 |
| V | PUQU-C(3)1-F | 5 |
| V | PGUQU-C(3)1-F | 5 |
| V | PGUQU-3-F | 5 |
| V | PPGI-3-F | 5 |
| IV | CPY-2-F | 3 |
| IV | CPGY-4-F | 3 |
| III | CC-3-V | 19 |
| III | CPP-3-2 | 5 |
| II | PUQY-3-F | 5 |
| I | PUQY-3-O2 | 10 |
| I | PUQY-3-O4 | 10 |
| I | PGUQY-3-O2 | 10 |
| I | PGUQY-4-O2 | 5 |

Δε[1 KHz, 20° C.]: 4.5
$\varepsilon_\perp$: 7.1
Δn[589 nm, 20° C.]: 0.115
Cp: 85° C.
$\gamma_1$: 86 mPa·s.
Tr: 7.3%

Example 8

| Category | Liquid crystal monomer code | Content (%) |
|---|---|---|
| V | CCU-5-F | 7 |
| V | PGU-3-F | 6 |
| V | CPUQU-C(5)-F | 8 |
| V | PUQU(2M)-3-F | 6 |
| V | PGUQU(2M)-3-F | 6 |
| V | PUQU-C(5)-F | 7 |
| IV | CPY-2-F | 3 |
| IV | CPGY-4-F | 3 |
| III | CC-3-V | 15 |
| III | CCG-V-F | 5 |
| II | PUQY-3-F | 4 |
| I | PUQY-3-O2 | 8 |
| I | PUQY-3-O4 | 8 |
| I | PGUQY-3-O2 | 9 |
| I | PGUQY-4-O2 | 5 |

Δε[1 KHz, 20° C.]: 5.8
$\varepsilon_\perp$: 8.7
Δn[589nm, 20° C.]: 0.125
Cp: 88° C.
$\gamma_1$: 80 mPa·s.
Tr: 7.3%

Example 9

| Category | Liquid crystal monomer code | Content (%) |
|---|---|---|
| VI | CY-3-O2 | 2 |
| VI | CCY-3-O2 | 3 |
| VI | PY-5-O2 | 2 |
| VI | CPY-3-O2 | 3 |
| V | CCU-3-F | 4 |
| V | CGU-5-F | 3 |
| V | PGUQU-3-F | 3 |
| IV | CPY-3-OT | 3 |
| IV | PPY-3-OT | 2 |
| III | CC-3-V | 19 |
| II | PUQY-3-F | 9 |
| II | PUQY-5-F | 9 |
| II | PGUQY-3-F | 10 |
| I | PUQY-3-O2 | 9 |
| I | PUQY-3-O4 | 9 |
| I | PGUQY-3-O2 | 10 |

Δε[1 KHz, 20° C.]: 3.3
$\varepsilon_\perp$: 5.3
Δn[589 nm, 20° C.]: 0.134
Cp: 80° C.
$\gamma_1$: 82 mPa·s.
Tr: 7.1%

Example 10

| Category | Liquid crystal monomer code | Content (%) |
|---|---|---|
| VI | CPY-3-O2 | 7 |
| VI | PYP-3-O2 | 8 |
| VI | COY-3-O2 | 7 |
| VI | CCOY-3-O2 | 8 |
| V | CCU-3-F | 6 |
| V | CGU-5-F | 5 |
| V | PGUQU-3-F | 5 |
| IV | CPY-3-F | 3 |
| III | CC-3-V | 22 |
| III | CCP-V-1 | 6 |
| III | CCG-V-F | 5 |
| II | PUQY-3-F | 6 |
| II | PUQY-5-F | 3 |
| II | PGUQY-3-F | 3 |
| I | PUQY-3-O2 | 2 |
| I | PUQY-3-O4 | 2 |
| I | PGUQY-3-O2 | 2 |

Δε[1 KHz, 20° C.]: 3.1
$\varepsilon_\perp$: 5.0
Δn[589 nm, 20° C.]: 0.101
Cp: 78° C.
$\gamma_1$: 70 mPa·s.
Tr: 7.1%

Example 11

| Category | Liquid crystal monomer code | Content (%) |
|---|---|---|
| VII | B-3-O2 | 2 |
| VII | B(S)-3-O4 | 2 |
| VII | BHHO-3-2FF | 1 |
| VI | CPY-3-O2 | 7 |
| VI | COY-3-O2 | 7 |
| VI | CCOY-3-O2 | 6 |
| V | CCU-3-F | 5 |
| V | CGU-5-F | 5 |
| V | PGUQU-3-F | 5 |
| V | DCU-3-F | 5 |
| V | CDU-3-F | 5 |

-continued

| Category | Liquid crystal monomer code | Content (%) |
|---|---|---|
| V | CCGU-3-F | 5 |
| IV | CCY-4-F | 2 |
| III | CC-3-V | 30 |
| II | PUQY-3-F | 1 |
| II | PUQY-5-F | 1 |
| II | PGUQY-3-F | 1 |
| I | PUQY-3-O2 | 3 |
| I | PUQY-3-O4 | 3 |
| I | PGUQY-3-O2 | 4 |

Δε[1 KHz, 20° C.]: 4.7
ε⊥: 7.0
Δn[589 nm, 20° C.]: 0.107
Cp: 79° C.
γ1: 75 mPa · s.
Tr: 7.2%

Example 12

| Category | Liquid crystal monomer code | Content (%) |
|---|---|---|
| VIII | PGP-3-2 | 2 |
| VIII | PGP-3-F | 3 |
| VIII | PP-1-5 | 1 |
| VIII | PGP-V-F | 2 |
| VII | B-3-O2 | 2 |
| VI | CPY-3-O2 | 3 |
| V | CCU-3-F | 5 |
| V | CGU-5-F | 5 |
| V | PGUQU-3-F | 5 |
| V | DCU-3-F | 5 |
| V | CDU-3-F | 5 |
| IV | CLY-4-F | 2 |
| III | CC-2-3 | 2 |
| III | CC-3-V | 40 |
| III | CC-3-V1 | 2 |
| III | CCP-V-1 | 1 |
| II | PUQY-3-F | 2 |
| II | PUQY-5-F | 2 |
| II | PGUQY-3-F | 3 |
| I | PUQY-3-O2 | 3 |
| I | PUQY-3-O4 | 3 |
| I | PGUQY-3-O2 | 2 |

Δε[1 KHz, 20° C.]: 4.3
ε⊥: 6.7
Δn[589 nm, 20° C.]: 0.104
Cp: 75° C.
γ1: 53 mPa · s.
Tr: 7.2%

By using the combination of compounds of formulas I, II and IV in the examples of the present invention, the dielectric anisotropy in the vertical direction of the liquid crystal compositions can be significantly increased without reducing the Δε of the liquid crystal compositions, so that the transmittances of the liquid crystal compositions can be greatly improved. The compound represented by formula III has a low rotary viscosity and also a higher clearing point (Cp), and when the compound is used in combination with compounds represented by formulas I, II and V, the rotary viscosity of the liquid crystal composition is reduced and the response speed thereof is accelerated. The liquid crystal composition of the present invention has a good stability to light and heat, a lower viscosity and a faster response speed, and can attain a wider refractive index and a higher clearing point (a wide service temperature range), and in particular, the liquid crystal composition has a higher light transmittance, thus allowing a display device to have a higher brightness or an energy saving effect.

The invention claimed is:

1. A liquid crystal composition, wherein said liquid crystal composition comprises one or more compounds represented by formula I, one or more compounds represented by formula II, one or more compounds represented by formula III and one or more compounds represented by formula IV2 and IV11,

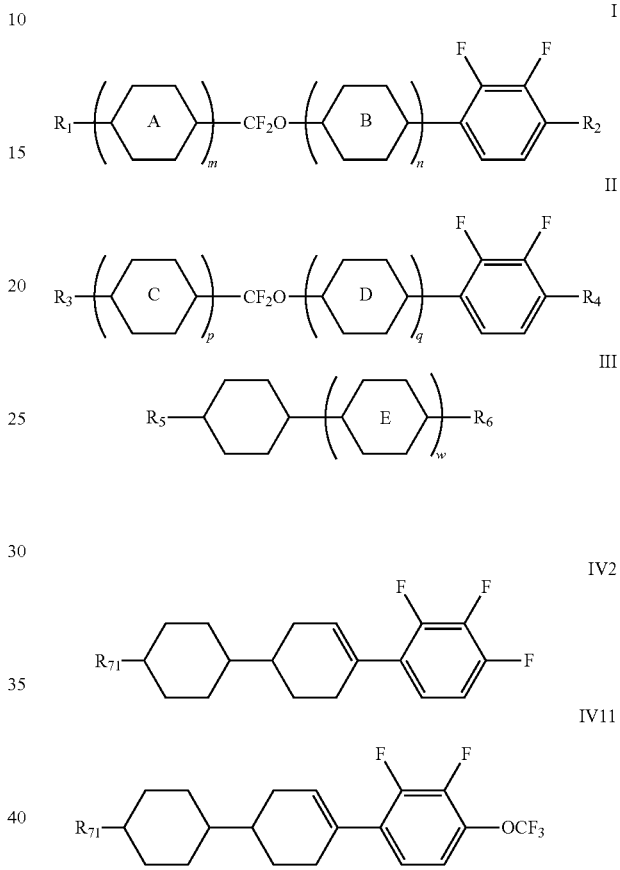

wherein
$R_1$, $R_2$, $R_3$, $R_5$, and $R_6$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8, and any one or more non-connected $CH_2$ in the groups represented by $R_1$ and $R_3$ are substituted with cyclopentyl, cyclobutyl, cyclopropyl or —O—;
$R_4$ represents F, $CF_3$, $OCF_3$, $OCHF_2$ or $OCH_2F$;

each independently represent

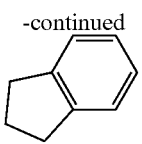

or any fluorobenzene;

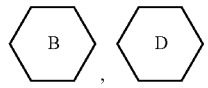

each independently represent benzene or any fluorobenzene;

represents

or any fluorobenzene;

m, p and w each independently represent 1, 2 or 3;

n and q each independently represent 0 or 1; and $R_{71}$ represents an alkyl group having a carbon atom number of 1-6 or an alkenyl group having a carbon atom number of 2-6.

2. The liquid crystal composition according to claim 1, wherein said one or more compounds represented by formula I are selected from the groups consisting of compounds represented by formulas I1 to I14; said one or more compounds represented by formula II are selected from the group consisting of compounds represented by formulas II1 to II14; said one or more compounds represented by formula III are selected from the group consisting of compounds of formulas III1 to III5;

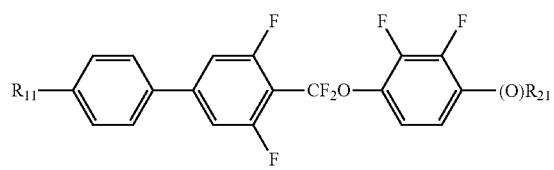

I1

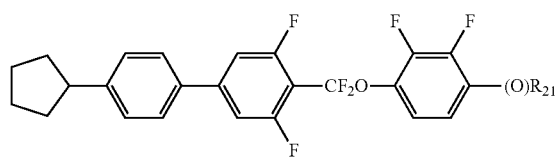

I2

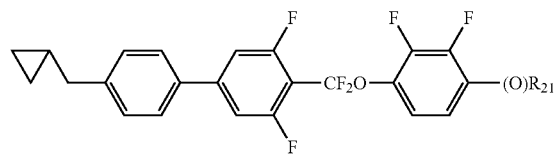

I3

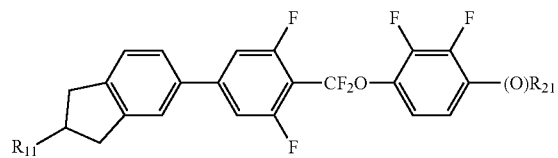

I4

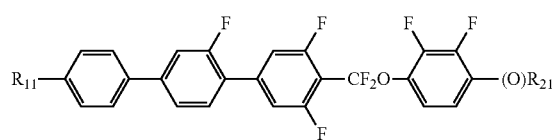

I5

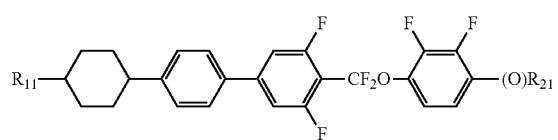

I6

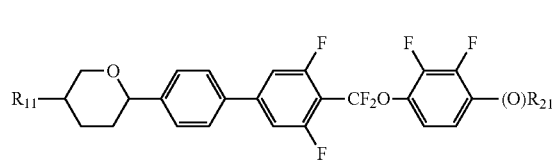

I7

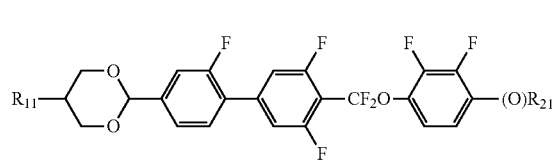

I8

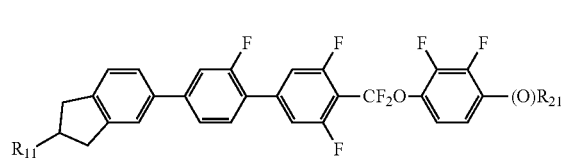

I9

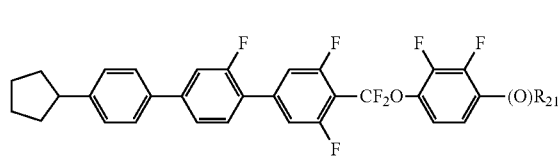

I10

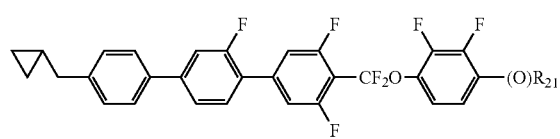

I11

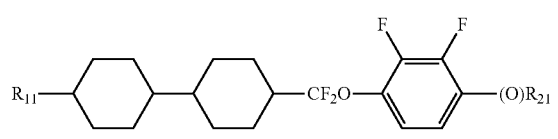

I12

-continued
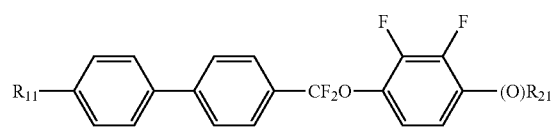  I13
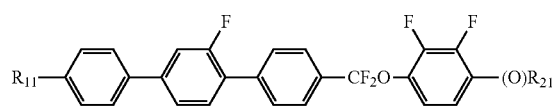  I14
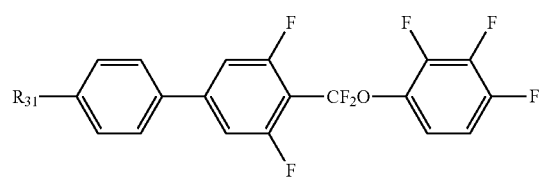  II1
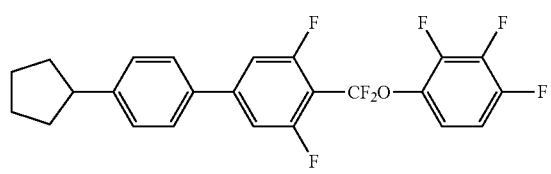  II2
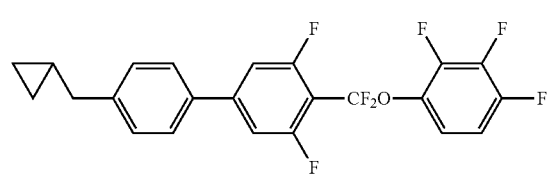  II3
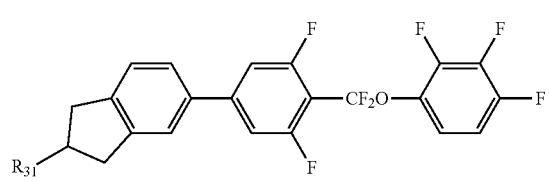  II4
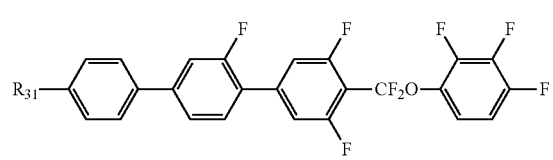  II5
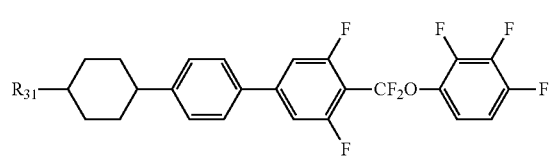  II6
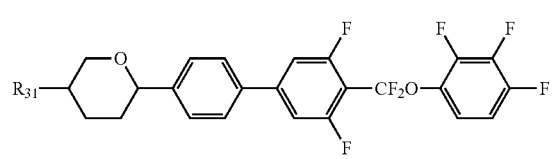  II7
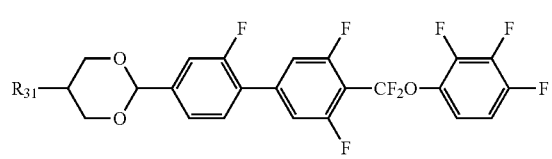  II8
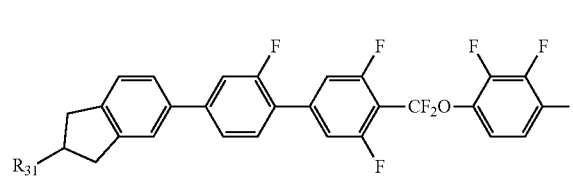  II9
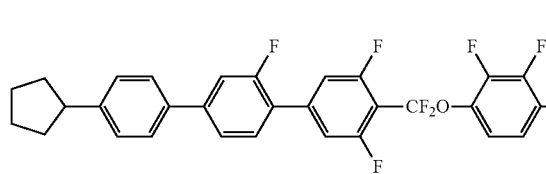  II10
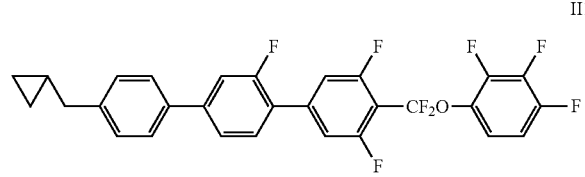  II11
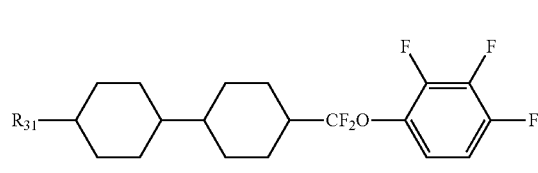  II12
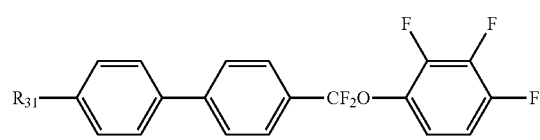  II13
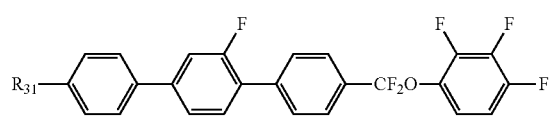  II14
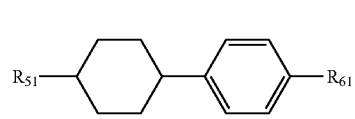  III1
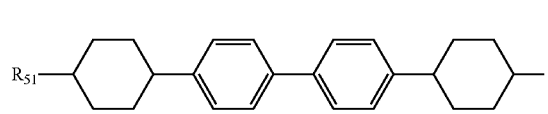  III2
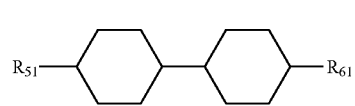  III3
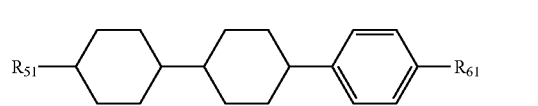  III4
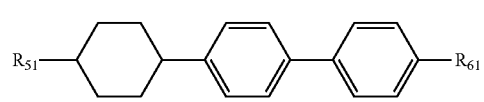  III5 wherein R$_{11}$ and R$_{31}$ each independently represent an alkyl group having a carbon atom number of 1-6;

(O)R$_{21}$ represents an alkyl or alkoxyl having a carbon atom number of 1-5;

R$_{51}$ and R$_{61}$ each independently represent an alkyl group having a carbon atom number of 1-6, an alkoxy group having a carbon atom number of 1-6, an alkenyl group having a carbon atom number of 2-6 or an alkenyloxy group having a carbon atom number of 3-6.

3. The liquid crystal composition according to claim 1, wherein in said liquid crystal composition, the total content in mass percentage of said one or more compounds represented by formula I is 1-40%, the total content in mass percentage of said one or more compounds represented by formula II is 1-40%, the total content in mass percentage of said one or more compounds represented by formula III is 1-80%, and the total content in mass percentage of said one or more compounds represented by formula IV is 0.5-30%.

4. The liquid crystal composition according to claim 1, wherein said liquid crystal composition further comprises one or more compounds represented by formula V,

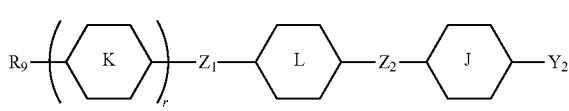

V wherein R$_9$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or an fluoro-substituted alkenoxy group having a carbon atom number of 3-8, and any one or more CH$_2$ in the group represented by R$_9$ are optionally substituted with cyclopentyl, cyclobutyl or cyclopropyl;

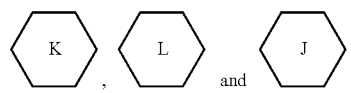

each independently represent

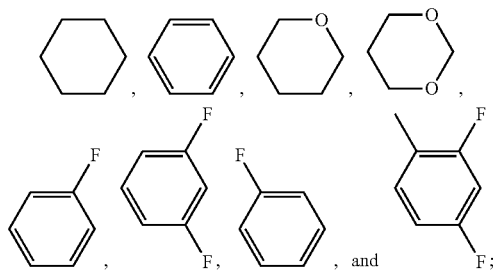

r represents 0, 1, 2 or 3;

Z$_1$ and Z$_2$ each independently represent a single bond, —CF$_2$O—, —CH$_2$CH$_2$—or —CH$_2$O—; and Y$_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5, or a fluoro-substituted alkenoxy group having a carbon atom number of 3-8.

5. The liquid crystal composition according to claim 4, wherein said one or more compounds represented by formula V are selected from the groups consisting of compounds represented by formulas V0 to V25,

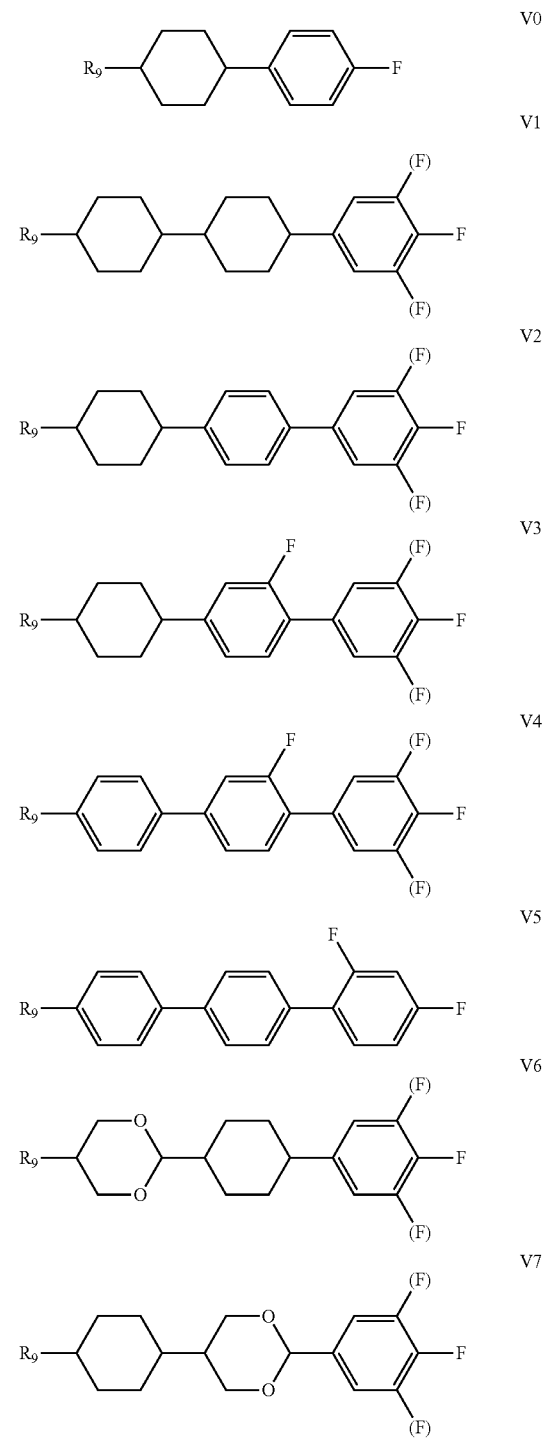

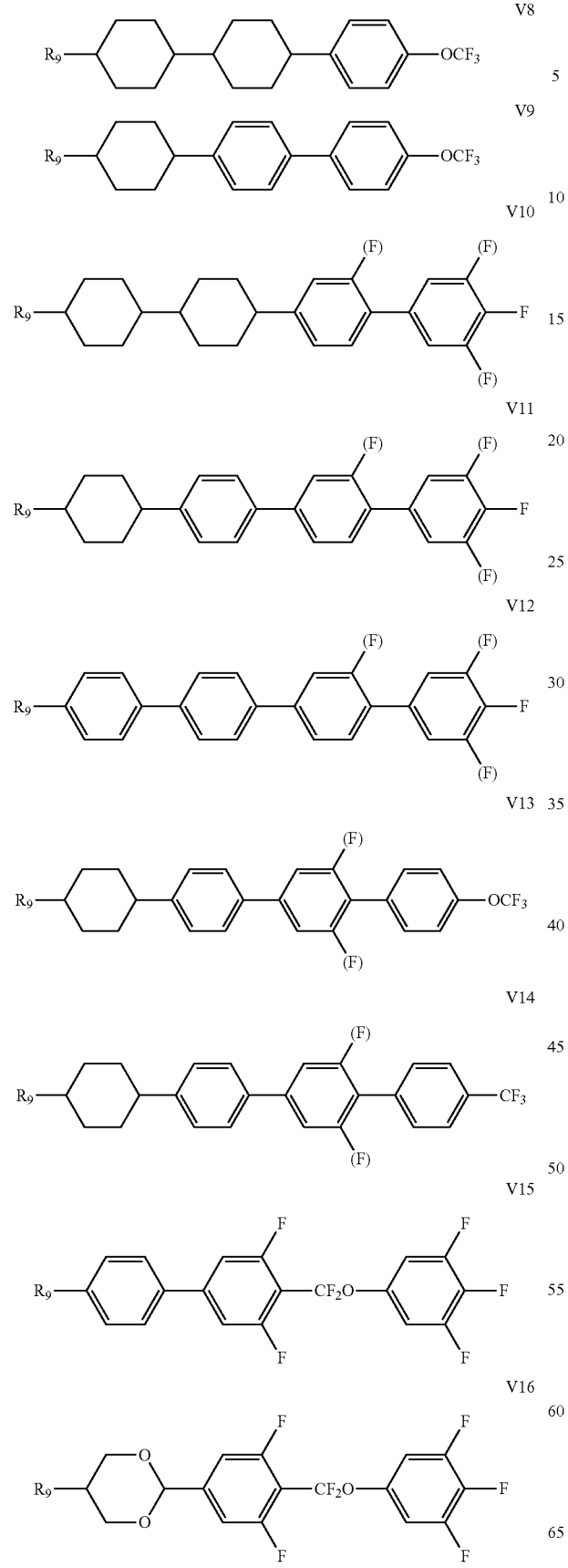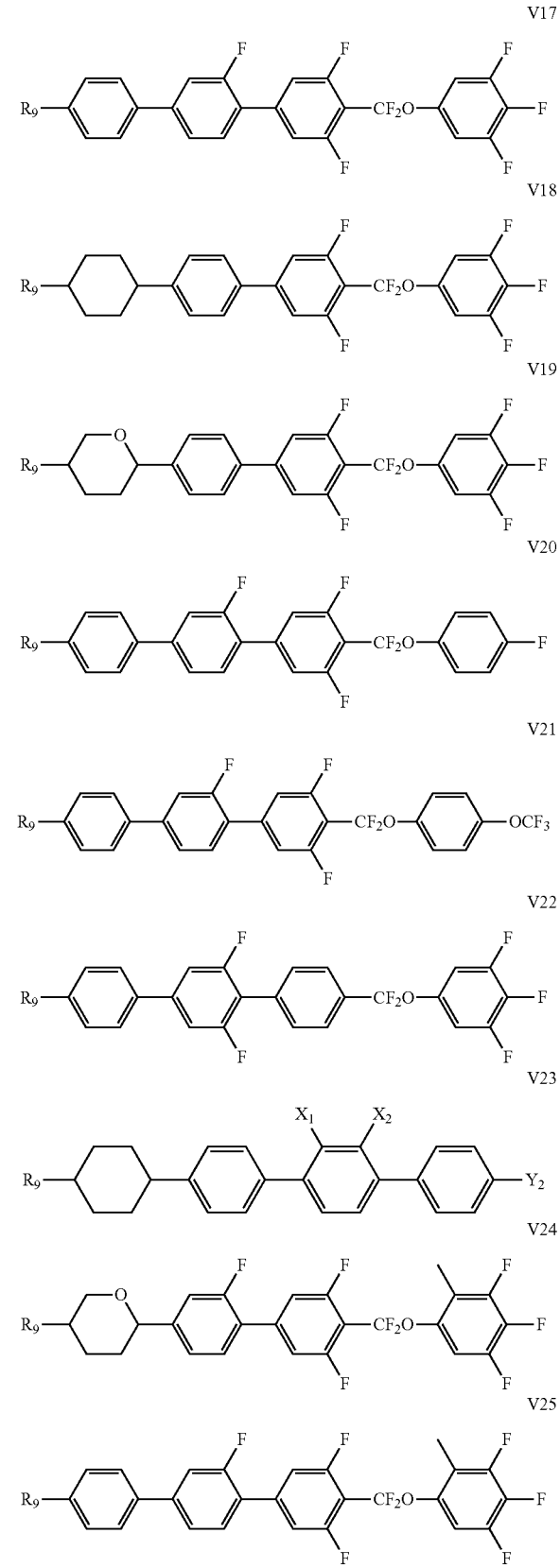
wherein $R_9$ represents an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the group represented $R_9$ are substituted with cyclopentyl, cyclobutyl or cyclopropyl;

(F) each independently represents H or F; and in formula V23, $X_1$ and $X_2$ each independently represent H or F, $Y_2$ represents F, a fluoro-substituted alkyl group having a carbon atom number of 1-5, a fluoro-substituted alkoxy group having a carbon atom number of 1-5, a fluoro-substituted alkenyl group having a carbon atom number of 2-5 or a fluoro-substituted alkenoxy group having a carbon atom number of 3-8.

6. The liquid crystal composition according to claim 1, wherein said liquid crystal composition further comprises one or more compounds represented by formula VI,

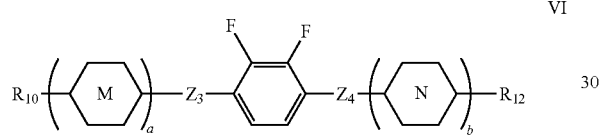

VI wherein $R_{10}$ and $R_{12}$ each independently represent an alkyl group having a carbon atom number of 1-10, fluoro, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_{10}$ and $R_{12}$ are optionally substituted with cyclopentyl, cyclobutyl or cyclopropyl;

$Z_3$ and $Z_4$ each independently represent a single bond, —$CH_2CH_2$— or —$CH_2O$—;

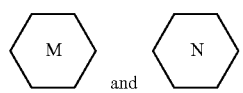

each independently represent

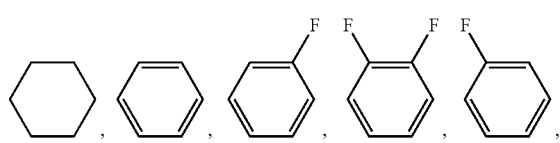

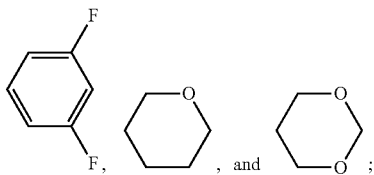

a represents 1, 2 or 3;

b represents 0 or 1.

7. The liquid crystal composition according to claim 6, wherein said one or more compounds represented by formula VI are selected from the groups consisting of compounds represented by formulas VI1 to VI12,

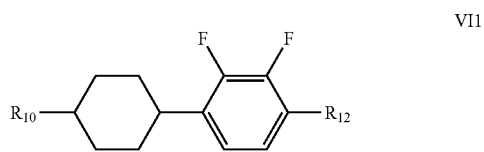

VI1

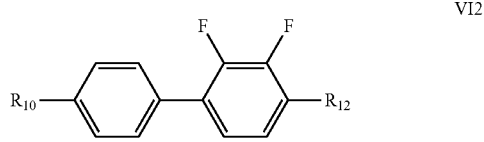

VI2

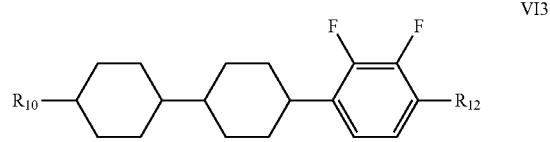

VI3

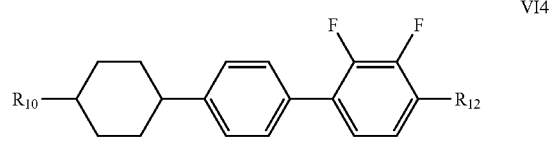

VI4

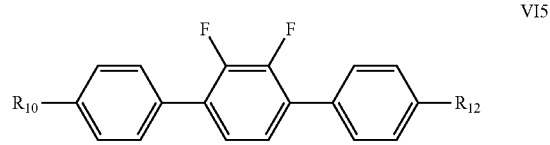

VI5

VI6

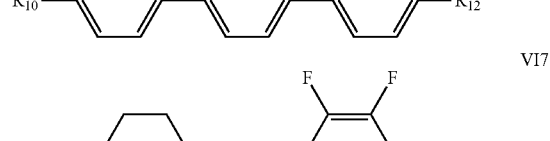

VI7

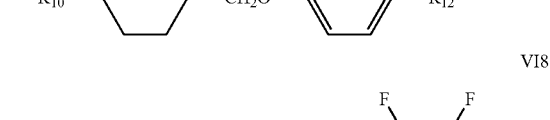

VI8

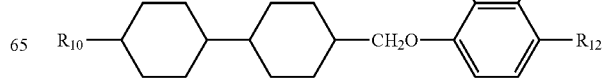

-continued

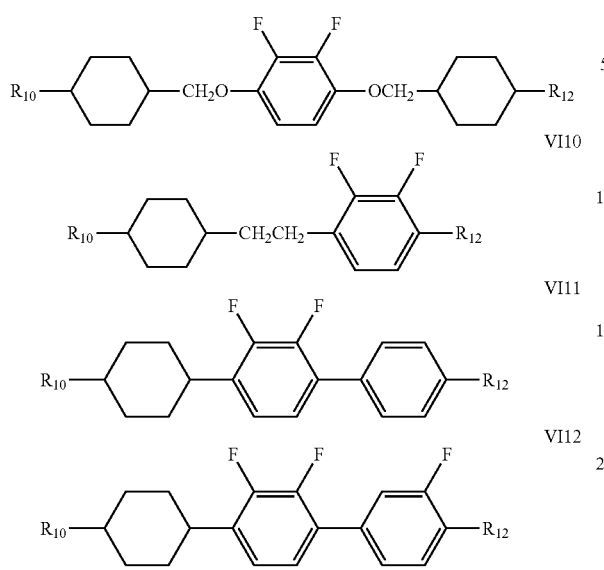

wherein $R_{10}$ and $R_{12}$ each independently represent an alkyl group having a carbon atom number of 1-10, fluoro, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_{10}$ and $R_{12}$ are optionally substituted with cyclopentyl, cyclobutyl or cyclopropyl.

8. The liquid crystal composition according to claim 1, wherein said liquid crystal composition further comprises one or more compounds represented by formula VII,

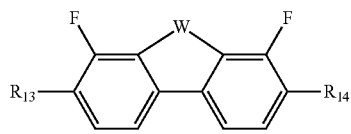

wherein $R_{13}$ and $R_{14}$ each independently represent an alkyl group having a carbon atom number of 1-10, a fluoro-substituted alkyl group having a carbon atom number of 1-10, an alkoxy group having a carbon atom number of 1-10, a fluoro-substituted alkoxy group having a carbon atom number of 1-10, an alkenyl group having a carbon atom number of 2-10, a fluoro-substituted alkenyl group having a carbon atom number of 2-10, an alkenoxy group having a carbon atom number of 3-8 or a fluoro-substituted alkenoxy group having a carbon atom number of 3-8, and any one or more $CH_2$ in the groups represented by $R_{13}$ and $R_{14}$ are optionally substituted with cyclopentyl, cyclobutyl or cyclopropyl; and W represents —O—, —S— or —$CH_2O$—.

9. The liquid crystal composition according to claim 1, further comprising one or more compounds represented by formula VIII,

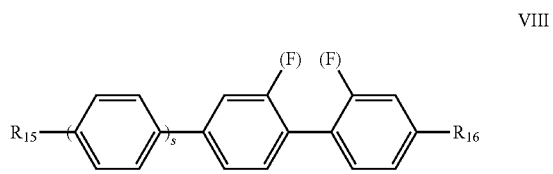

wherein $R_{14}$ represents an alkyl group having a carbon atom number of 1-5 or an alkenyl group having a carbon atom number of 2-5;

$R_{15}$ represents an F atom, an alkyl group having a carbon atom number of 1-5, an alkoxy group having a carbon atom number of 1-5 or an alkenyl group having a carbon atom number of 2-5, and any one or more $CH_2$ in the groups represented by $R_{15}$ and $R_{16}$ are optionally substituted with cyclopentyl, cyclobutyl or cyclopropyl;

s represents 0 or 1; and (F) represents H or F.

10. A liquid crystal display element or liquid crystal display comprising the liquid crystal composition of claim 1, wherein said liquid crystal display element or liquid crystal display is an active matrix display element or display or a passive matrix display element or display.

\* \* \* \* \*